Figure 1:
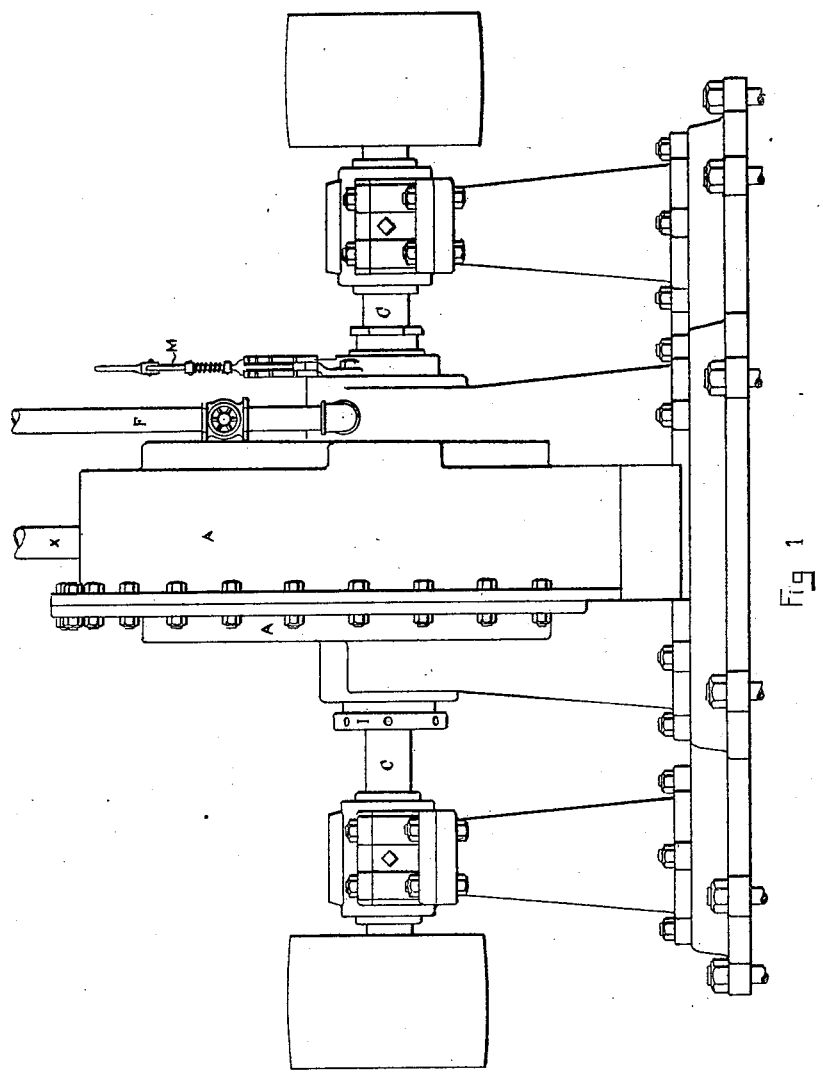

No. 677,752. Patented July 2, 1901.
T. R. BELLAS.
ROTARY ENGINE.
(Application filed Sept. 19, 1900.)

(No Model.) 5 Sheets—Sheet 1.

No. 677,752. Patented July 2, 1901.
T. R. BELLAS.
ROTARY ENGINE.
(Application filed Sept. 19, 1900.)
(No Model.) 5 Sheets—Sheet 2.
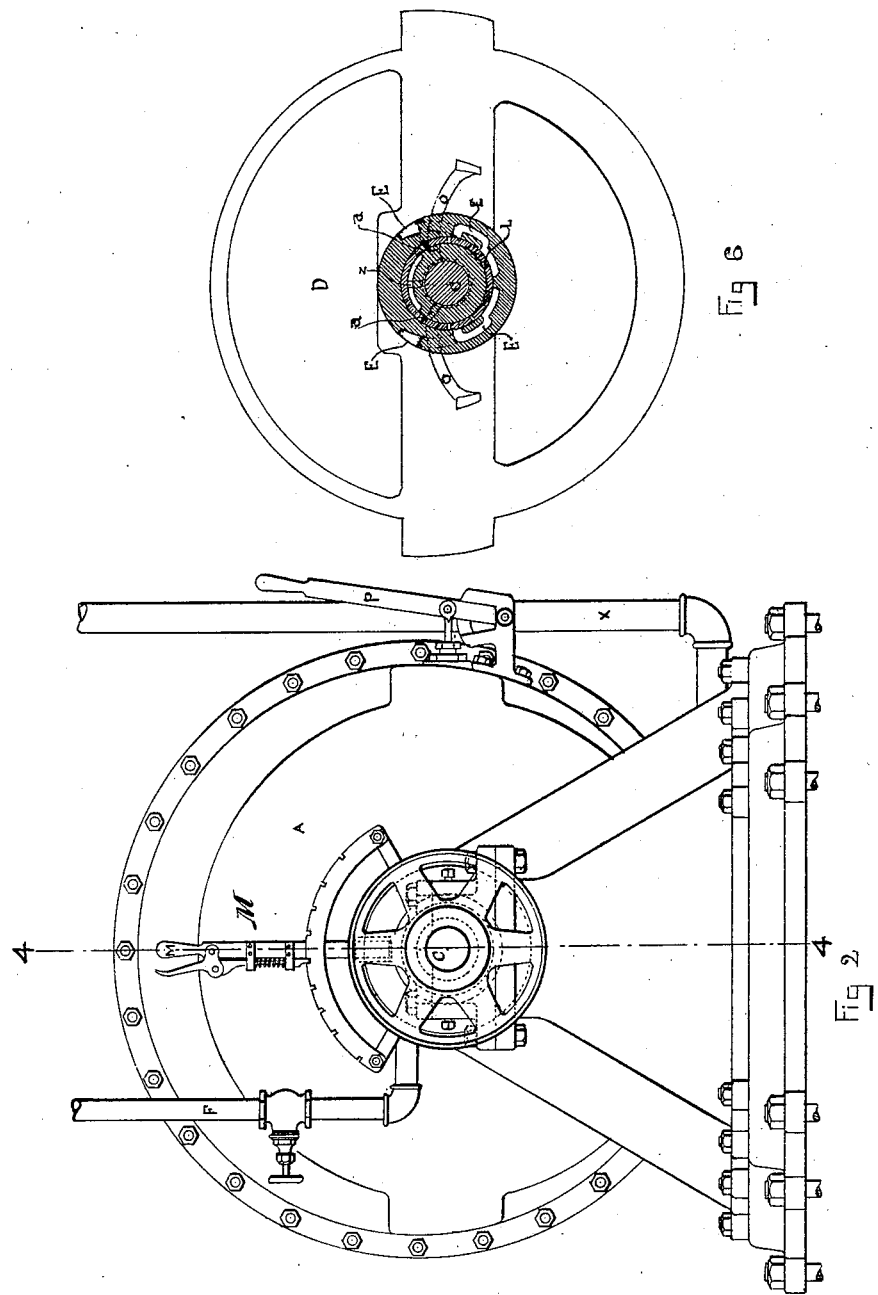

No. 677,752. Patented July 2, 1901.
T. R. BELLAS.
ROTARY ENGINE.
(Application filed Sept. 19, 1900.)
(No Model.) 5 Sheets—Sheet 3.
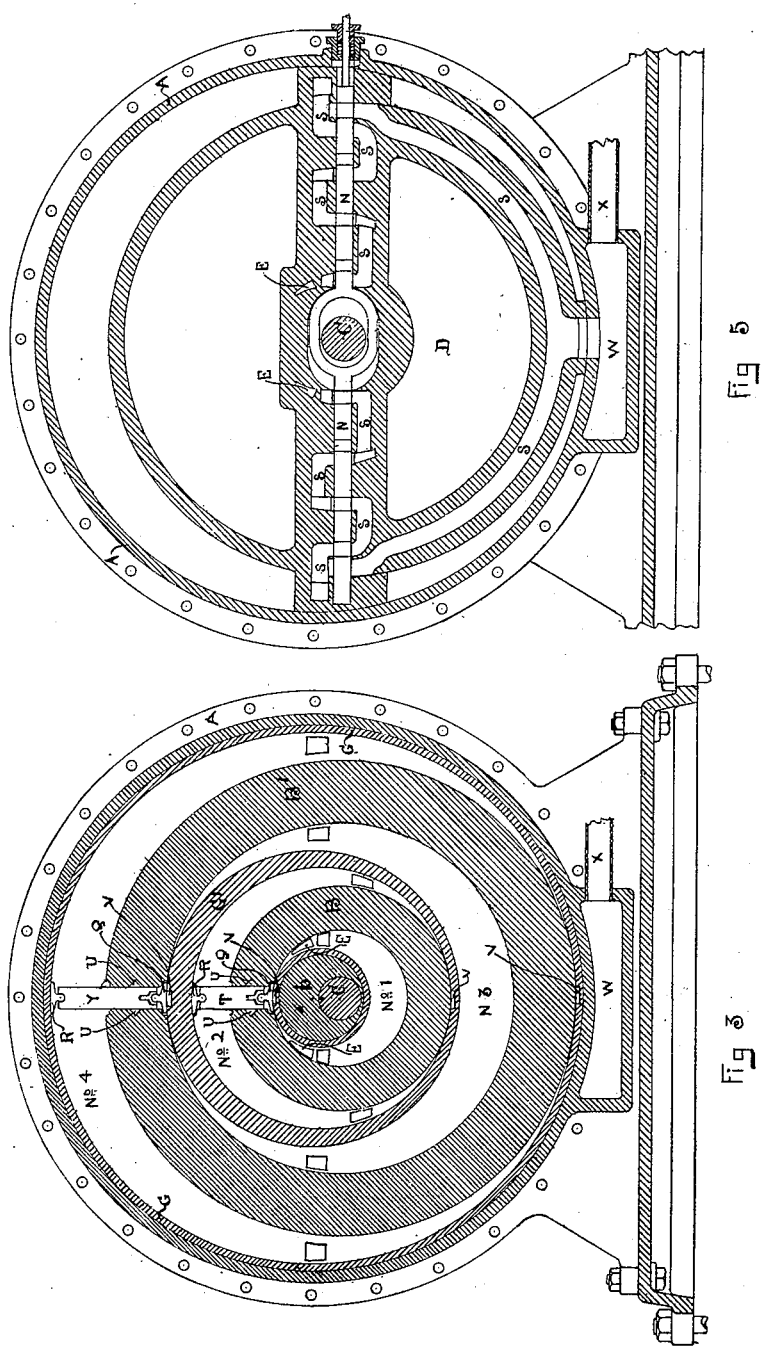

No. 677,752. Patented July 2, 1901.
T. R. BELLAS.
ROTARY ENGINE.
(Application filed Sept. 19, 1900.)
(No Model.) 5 Sheets—Sheet 4.
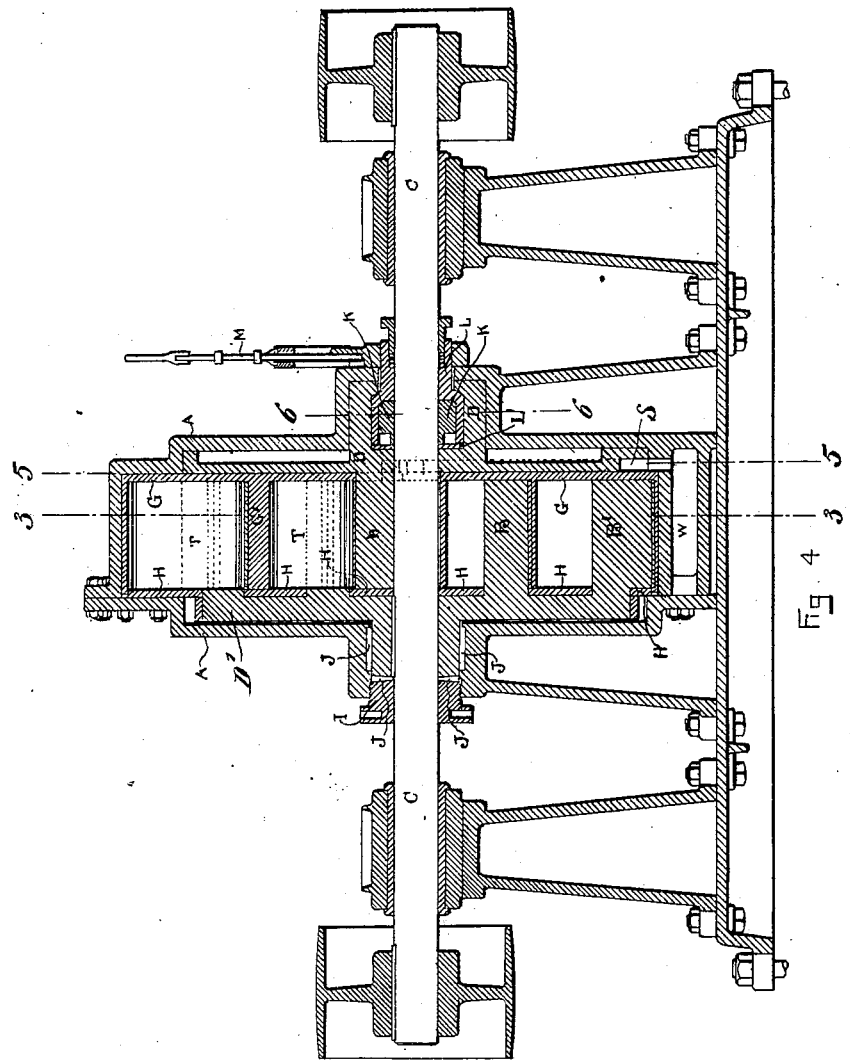

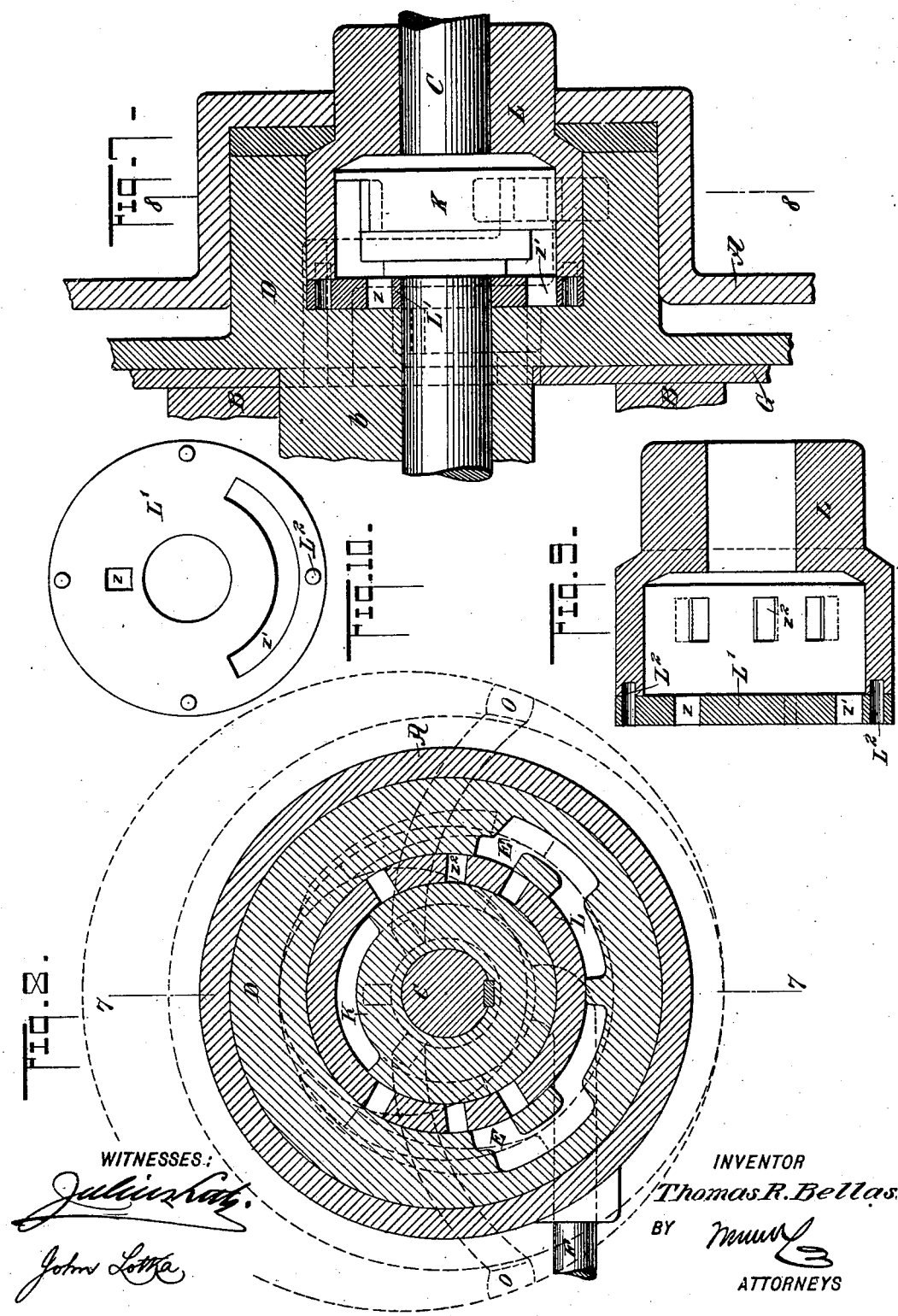

UNITED STATES PATENT OFFICE.

THOMAS R. BELLAS, OF JOPLIN, MISSOURI, ASSIGNOR OF ONE-HALF TO WILLIAM B. REES, OF SAME PLACE.

ROTARY ENGINE.

SPECIFICATION forming part of Letters Patent No. 677,752, dated July 2, 1901.

Application filed September 19, 1900. Serial No. 30,494. (No model.)

*To all whom it may concern:*

Be it known that I, THOMAS R. BELLAS, a citizen of the United States, and a resident of Joplin, in the county of Jasper and State of Missouri, have invented a new and Improved Rotary Engine, of which the following is a full, clear, and exact description.

My invention relates to rotary engines, and has for its object to provide a construction in which a plurality of cylinders or working chambers may be located within a comparatively small space, so as to secure a powerful engine of small dimensions; and a further object of my invention is to so construct the engine that a compound action may be obtained and that the periods of operation by live steam and by expansion may be varied in their relative length.

The invention will be described hereinafter and the features of novelty pointed out in the appended claims.

Reference is to be had to the accompanying drawings, forming a part of this specification, in which similar characters of reference indicate corresponding parts in all the views.

Figure 1 is a side elevation of my improved engine. Fig. 2 is an end elevation thereof. Figs. 3 and 5 are cross-sections on the lines 3 3 and 5 5, respectively, of Fig. 4. Fig. 4 is a longitudinal section on the line 4 4 in Fig. 2. Fig. 6 is a detail cross-section on the line 6 6 in Fig. 4. Figs. 7 and 8 are sections of the revolving valve K and adjacent parts, taken, respectively, on line 7 7 of Fig. 8 and line 8 8 of Fig. 7. Fig. 9 is a longitudinal section of the sleeve L, which surrounds the revolving valve, and the plate at the end of the sleeve; and Fig. 10 is a face view of the plate at the end of the sleeve.

The engine is provided with a suitable stationary frame A, which forms the outer wall of one of the cylinders, and is preferably provided with an interior lining G. About concentrically with this lining is arranged a cylinder G', and within the latter and spaced therefrom is a hub $b$. These parts therefore are stationary. Journaled eccentrically within the hub $b$ is arranged the engine-shaft C. With this shaft are rigidly connected, so as to turn therewith, a sleeve B and a larger sleeve B'. The relative dimensions of the sleeves, cylinders, and hub will be understood best from Fig. 3, in which it is shown that the sleeve B engages at the same time the hub $b$ at one point and the cylinder G' at a diametrically opposite point. The sleeve B' has a corresponding engagement with the cylinder G' and the lining G. In the rotating sleeves B B' are mounted to slide in an approximately radial direction piston-heads T and Y, respectively, provided at their inner and outer ends with packing-shoes Q and R, respectively, and engaged upon their sides by packing-strips U, located in the said sleeves B B'. The lining G and cylinder G' are provided with spring packing-strips V. Steam is admitted through the inlet-pipe F to a valve-sleeve L, which normally is stationary, but may be turned more or less by means of the regulating-lever M. This regulating-lever is of the well-known type shown in Fig. 2—that is, it may be locked in several different positions. The valve-sleeve L surrounds the shaft C and the valve K, which is mounted to rotate with said shaft C. The plate D, which forms part of the frame A, has steam-inlet ports E and outlet-ports $a$ $o$. At the inner end of the sleeve L is arranged an apertured plate L', secured thereto by pins L², the plate practically forming an integral part of the sleeve. The plate has ports $z$ $z'$ and the sleeve has ports $z^2$. The ports E communicate with the inlet-pipe F and the ports $o$ communicate with a box W and the exhaust-pipe X. On the side opposite the plate D the revolving sleeves B B' are secured to a plate D', which is keyed to the engine-shaft. In order to obtain a tight joint, I provide a plug I capable of moving lengthwise of the shaft and screwing into the frame A to adjust the plate D' relatively thereto to reduce friction and provide rollers J between the frame A, the plate D', and the plug I.

The engine is reversible, and for this purpose I provide the arrangement shown particularly in Fig. 5. This consists of the sliding valve operated by means of a reversing-lever P, Fig. 2, and having a series of ports adapted to register with corresponding ports S in the plate D.

By reference to Fig. 3 it will be seen that the construction hereinbefore described provides for a separate working chamber—namely, a chamber No. 1 between the hub $b$ and the sleeve B and another chamber No. 2 between the sleeve B and the cylinder G', a third chamber No. 3 between the cylinder G' and the sleeve B', and finally a fourth chamber between the sleeve B' and the lining or cylinder G. It will be seen that these chambers are practically one within the other and increase in area, as is required when using steam expansively in several successive cylinders. It will be understood that steam is admitted first to the innermost working chamber No. 1 and then passes successively to the chambers Nos. 2, 3, and 4 and to the exhaust. The time during which live steam is admitted and that during which the steam works expansively can be varied considerably by operating the regulating-lever M. Thus in Fig. 2 the lever is shown in the center position, which is the one of rest, the ports E being both closed at that time, so that steam is cut off from the engine. If the lever is thrown to the first notch from the center, the valve-sleeve L is brought into such position that the revolving valve K will admit steam into the innermost cylinder No. 1 during one-fourth of a revolution only, after which steam is automatically cut off and continues to work expansively for one and three-fourths of a revolution, finally passing to the exhaust-pipe X. If the lever M is thrown to the second notch, the position of the sleeve L will be such that live steam will be admitted to the chamber No. 1 for a half-revolution, while the period of expansion will extend over one and one-half revolutions. By further throwing the lever M to the third notch from the center the valve-sleeve L assumes a position in which the valve K will admit live steam for a full half-revolution into the chamber No. 1 and for a quarter-revolution into chamber No. 2, then cutting off the steam and allowing it to work expansively during one and one-fourth revolutions. Should the lever M be put to the fourth notch, the sleeve L will be in such a position as to connect the ports $z$ and $a$, causing live steam to pass into the chambers Nos. 1 and 2 for one and one-half revolutions and to work expansively for a half-revolution in the chamber No. 4. This is used especially when starting the engine under a heavy load.

The operation of the reversing-lever will be clear from Fig. 5, in which the exhaust-ports are closed on one side and opened on the opposite side, and it will be obvious that the conditions are reversed by bringing the valve to the opposite position.

It will be understood that the inner chamber No. 1 has two inlet-ports E and two exhaust-ports $o$, while each of the other chambers has only two ports, one of which serves as the inlet-port and the other as the exhaust-port. Only two of the four ports of the inner chamber are active at a time, the others coming into action when the engine is reversed.

Having thus fully described my invention, I claim as new and desire to secure by Letters Patent—

1. The combination of the stationary parts and the revolving sleeves forming working chambers with said stationary parts, a valve held to rotate with said sleeves, connections or channels whereby the motive agent may pass from one chamber to another, a normally stationary adjustable sleeve controlling the admission and cut-off of the motive agent to and from one of said chambers, and means for adjusting said sleeve.

2. The combination of the stationary parts and the revolving sleeves forming working chambers with said stationary parts, a valve held to rotate with said sleeves, connections or channels whereby the motive agent may pass from one chamber to another, a normally stationary adjustable sleeve having ports which in one position of the sleeve are closed to stop the engine, while in a second position the sleeve-ports admit the motive agent to one working chamber only, and in a third position the sleeve-ports admit the live motive agent directly to a plurality of working chambers, and means for adjusting said sleeve.

3. The combination of the stationary parts and the revolving sleeves forming working chambers with said stationary parts, a valve held to rotate with said sleeves, connections or channels whereby the motive agent may pass from one chamber to another, a normally stationary reversing-valve movable about diametrically with reference to the revolving sleeves and provided at each side of the center with apertures one-half of which are arranged to register with said connecting-channels at a time, while the other apertures of the reversing-valve are closed, and means for shifting said reversing-valve.

In testimony whereof I have signed my name to this specification in the presence of two subscribing witnesses.

THOMAS R. BELLAS.

Witnesses:
S. H. KELLY,
W. S. PAUL.